United States Patent
Kim et al.

(10) Patent No.: US 11,437,051 B2
(45) Date of Patent: Sep. 6, 2022

(54) METHOD AND APPARATUS FOR IDENTIFYING TYPE OF VOCODER

(71) Applicant: AGENCY FOR DEFENSE DEVELOPMENT, Daejeon (KR)

(72) Inventors: Hong Kook Kim, Gwangju (KR); Seung Ho Choi, Seoul (KR); Deokgyu Yun, Seoul (KR); Jung Hyuk Lee, Gwangju (KR)

(73) Assignee: Agency For Defense Development, Daejeon (KR)

( * ) Notice: Subject to any disclaimer, the term of this patent is extended or adjusted under 35 U.S.C. 154(b) by 280 days.

(21) Appl. No.: 16/913,612

(22) Filed: Jun. 26, 2020

(65) Prior Publication Data

US 2020/0411023 A1    Dec. 31, 2020

(30) Foreign Application Priority Data

Jun. 28, 2019    (KR) .................. 10-2019-0077910

(51) Int. Cl.
*G10L 19/16* (2013.01)
*G06K 9/62* (2022.01)
*G06F 17/18* (2006.01)
*G06N 20/00* (2019.01)
*H04L 65/70* (2022.01)
*H04L 65/75* (2022.01)

(52) U.S. Cl.
CPC .......... *G10L 19/167* (2013.01); *G06F 17/18* (2013.01); *G06K 9/6232* (2013.01); *G06N 20/00* (2019.01); *H04L 65/70* (2022.05); *H04L 65/75* (2022.05)

(58) Field of Classification Search
CPC ........ G10L 19/167; H04L 65/75; H04L 65/70
See application file for complete search history.

(56) References Cited

U.S. PATENT DOCUMENTS

2016/0372126 A1* 12/2016 Atti .................. G10L 19/087
2017/0053658 A1*  2/2017 Atti .................. G10L 19/24

FOREIGN PATENT DOCUMENTS

KR        10-1893684 B1    8/2018

OTHER PUBLICATIONS

Lee et al., "Deep Learning Based Vocoder Type Classification", The Institute of Electronics and Information Engineers—4 pages (Jun. 2017).

(Continued)

*Primary Examiner* — Adnan M Mirza
(74) *Attorney, Agent, or Firm* — Knobbe Martens Olson & Bear LLP (57) ABSTRACT

In accordance with an aspect of the present disclosure, there is provided a method for identifying a type of a vocoder. The method comprises acquiring identification target bitstreams encoded with a voice signal, acquiring, for each of a plurality of vocoders, a probability that each of the plurality of vocoders is related to the identification target bitstreams from the identification target bitstreams, acquiring waveforms for each decoder of each of the plurality of vocoders by inputting the identification target bitstreams to the each decoder of each of the plurality of vocoders, acquiring intelligibility values for each of the waveforms obtained for the each decoder of each of the plurality of vocoders from the waveforms, and determining the type of the vocoder related to the voice signal from the probability and the intelligibility values for each waveform.

11 Claims, 7 Drawing Sheets

(56) References Cited

OTHER PUBLICATIONS

Yun et al., "A Non-Intrusive Speech Intelligibility Estimation Method Based on Recurrent Neural Network with Long Short-Term Memory", The Journal of Korean Institute of Communications and Information Sciences, vol. 42, No. 9—4 pages (Sep. 2017).

Lee et al., Abstract of "Deep Learning Based Military Vocoder Type Detection Applied to Vocoder Bitstream", The Korean Society of Speech Sciences—4 pages (May 26, 2018).

\* cited by examiner

METHOD AND APPARATUS FOR IDENTIFYING TYPE OF VOCODER

CROSS-REFERENCE TO RELATED APPLICATION

This application claims priority to Korean Patent Application No. 10-2019-0077910, filed on Jun. 28, 2019, the entire contents of which are incorporated herein by reference.

TECHNICAL FIELD

The present disclosure relates to a method and an apparatus for identifying a type of a vocoder using a machine learning model.

BACKGROUND

In the mutual voice communication, a voice signal is encoded in the form of a bitstream by a vocoder of a transmitting side and transmitted to a receiving side. The receiving side performs decoding using a decoder corresponding to the vocoder used to generate the bitstream, and reconstructs the voice signal to restore it to the actual voice. For accurate transmission of the voice, the decoder corresponding to a type of the vocoder used for encoding may be necessary to be used.

The disclosure of this section is to provide background information relating to the invention. Applicant does not admit that any information contained in this section constitutes prior art.

SUMMARY

The present disclosure provides a method and apparatus for identifying a type of a vocoder that improves the efficiency of decoding by identifying a type of the vocoder used to encode a voice signal, using a machine learning model, even if there is no prior information about the vocoder used to encode the voice signal.

In accordance with an aspect of the present disclosure, there is provided a method for identifying a type of a vocoder. The method comprises acquiring identification target bitstreams encoded with a voice signal, acquiring, for each of a plurality of vocoders, a probability that each of the plurality of vocoders is related to the identification target bitstreams from the identification target bitstreams, using a first machine learning model trained based on a relationship between the plurality of vocoders and training bitstreams obtained by encoding a training voice signal by each of the plurality of vocoders, acquiring waveforms for each decoder of each of the plurality of vocoders by inputting the identification target bitstreams to the each decoder of each of the plurality of vocoders, acquiring intelligibility values for each of the waveforms obtained for the each decoder of each of the plurality of vocoders from the waveforms obtained for the each decoder of each of the plurality of vocoders, using a second machine learning model trained based on a relationship between a plurality of training waveforms obtained by inputting the training bitstreams to the each decoder of each of the plurality of vocoders and decoding the training bitstreams for each decoder of each of the plurality of vocoders, and training intelligibility values quantifying a degree of the intelligibility of the training voice signal obtained for each of the plurality of training waveforms, and determining the type of the vocoder related to the voice signal from the probability that each of the plurality of vocoders are related to the identification target bitstreams and the intelligibility values for each waveform obtained for each decoder of each of the plurality of vocoders, using a third machine learning model trained based on a probability for each vocoder encoding the training voice signal and a training intelligibility value of the training voice signal obtained by each decoder of the plurality of vocoders.

In accordance with another aspect of the present disclosure, there is provided an apparatus for identifying a type of a vocoder. The apparatus comprises a bitstream acquisition unit configured to acquire identification target bitstreams encoded with a voice signal, a predicted type identification unit configured to acquire, for each of a plurality of vocoders, a probability that each of the plurality of vocoders is related to the identification target bitstreams from the identification target bitstreams, using a first machine learning model trained based on a relationship between the plurality of vocoders and training bitstreams obtained by encoding a training voice signal by each of the plurality of vocoders, an intelligibility value acquisition unit configured to acquire waveforms for each decoder of each of the plurality of vocoders by inputting the identification target bitstreams to the each decoder of each of the plurality of vocoders, and acquire intelligibility values for each of the waveforms obtained for the each decoder of each of the plurality of vocoders from the waveforms obtained for the each decoder of each of the plurality of vocoders, using a second machine learning model trained based on a relationship between a plurality of training waveforms obtained by inputting the training bitstreams to the each decoder of each of the plurality of vocoders and decoding the training bitstreams for each decoder of each of the plurality of vocoders, and training intelligibility values quantifying a degree of the intelligibility of the training voice signal obtained for each of the plurality of training waveforms, and a vocoder type determination unit configured to determine the type of the vocoder related to the voice signal from the probability that each of the plurality of vocoders are related to the identification target bitstreams and the intelligibility values for each waveform obtained for each decoder of each of the plurality of vocoders, using a third machine learning model trained based on a probability for each vocoder encoding the training voice signal and a training intelligibility value of the training voice signal obtained by each decoder of the plurality of vocoders.

The method and apparatus for identifying a type of the vocoder according to embodiments of the present disclosure can make decoding of the voice signal more efficient and accurate by identifying the type of the vocoder used to encode the voice signal, using the machine learning model, even if there is no prior information about the vocoder used to encode the voice signal.

DETAILED DESCRIPTION

The advantages and features of embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

Functional blocks illustrated in the drawings and described below are merely examples of possible implementations. In other implementations, different functional blocks may be used without departing from the scope of the detailed description. Although one or more functional blocks of the present disclosure are illustrated as separate blocks, one or more of the functional blocks of the present disclosure may be a combination of various hardware and software elements executing the same function.

Further, it should be understood that an expression that some elements are "included" is an expression of an "open type" and the expression simply denotes that the corresponding elements are present, but does not exclude additional elements.

Furthermore, when one element is described as being "connected" or "coupled" to the other element, it should be understood that one element may be directly connected or coupled to the other element, but a third element may be interposed between the two elements.

The terms used herein, including ordinal numbers such as "first" and "second" may be used to describe, and not to limit, various components. The terms simply distinguish the components from one another.

However, if necessary, the receiving side may not have prior information about the vocoder used for encoding. In this case, decoding of the voice signal is performed by decoding the decoders corresponding to each of all the vocoders available for decoding the voice signal.

That is, since the decoding for all vocoders should be performed in order to restore the voice signal, it takes a lot of time to perform the encoding to deteriorate the efficiency of decoding. Accordingly, there is a need for a method for improving the efficiency of decoding by identifying a vocoder (or a type of the vocoder) used for encoding, even if there is no prior information about the vocoder, so that a decoder corresponding to the vocoder can decode the voice signal.

Figure 1:
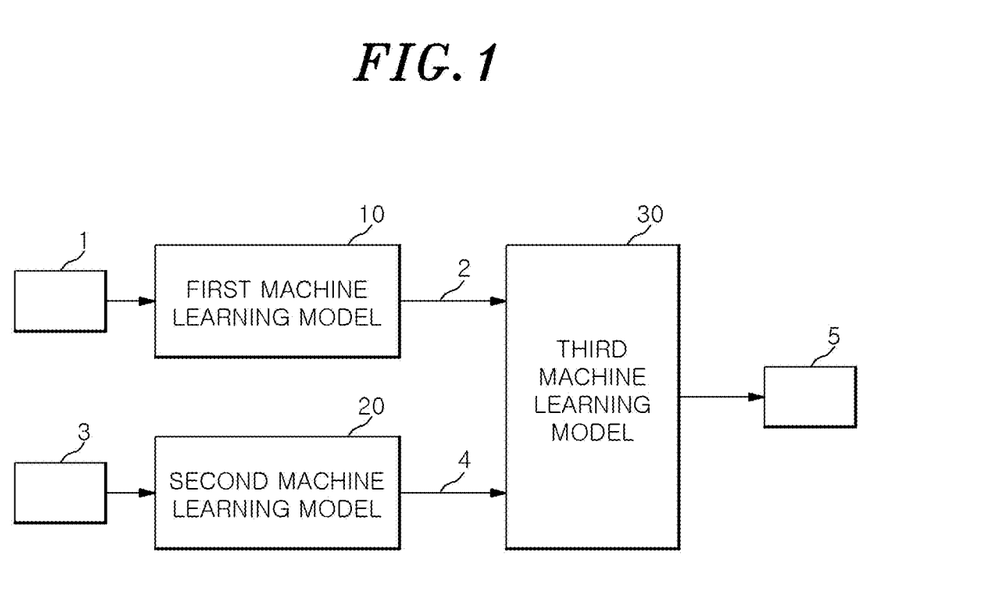
FIG. 1 conceptually illustrates a method for identifying a type of the vocoder according to an embodiment of the present disclosure.

FIG. 1 conceptually illustrates a method for identifying a type of the vocoder according to an embodiment of the present disclosure.

Referring to FIG. 1, a bitstream 1 of a voice signal to be decoded may be input to a first machine learning model 10 to output a predicted type 2 of the vocoder. Herein, the first machine learning model 10 may be trained based on a relationship between a plurality of vocoders and the bitstreams.

On the other hand, the bitstream 1 is an encoded voice signal that may be necessary to be decoded and found. In some cases, the bitstream 1 may be transformed into a bitstream combination related to m (natural numbers of 2 or more) or more vocoders, and then be converted into a feature vector representing features of the bitstream combination to be input to the first machine learning model 10. In the first machine learning model 10 in this case, learning is performed based on a relationship between the feature vector and the predicted type 2 of the vocoder. A detailed description related to this learning may be referred to FIG. 4 and a detailed description related to the bitstream combination may be referred to FIG. 5.

Specifically, the voice signal may be encoded by m vocoders to receive bitstreams associated with each vocoder at different time intervals. In this case, the bitstream combination may be formed by combining the portions that are received at the same time interval among the received bitstreams, and then feature vectors for these portions may be taken to input them to the first machine learning model 10.

A predicted type of the vocoder output by the first machine learning model 10 may include information about one of a plurality of predetermined vocoders. The plurality of predetermined vocoders may include various vocoders that are available for encoding the voice signal, for example, an LPC vocoder, an MELP vocoder, and a CELP vocoder.

If the LPC vocoder is defined as [0 0 1], the MELP vocoder is defined as [0 1 0], and the CELP vocoder is defined as [1 0 0], the first machine learning model 10 can output any one of [0 0 1], [0 1 0], and [1 0 0] as a predicted type of the vocoder. For another example, the predicted type of the vocoder may include information on relevance (e.g., a probability that was used for encoding) with the bitstream 1 for each of the plurality of vocoders. In this case, the first machine learning model 10 may output a numerical value indicating the relevance for each of the vocoders as the predicted type of the vocoder.

In some cases, the predicted type of the vocoder output by the first machine learning model 10 may output an error value (or unknown) in addition to the plurality of predetermined vocoders. For example, the first machine learning model 10 may also output the error value defined as [0 0 0] in addition to [0 0 1], [0 1 0], and [1 0 0], which are information related to the predicted type of the vocoder described above.

In a second machine learning model 20, a plurality of waveforms obtained by decoding the bitstream 1 for each of the plurality of vocoders may be input and an intelligibility value 4 for each of the plurality of waveforms may be output. Herein, the second machine learning model 20 may be trained based on a relationship between the waveform and the intelligibility value, and a detailed description related to the training of the second machine learning model 20 will be specified later with reference to FIG. 6.

Specifically, the plurality of waveforms may be acquired based on input of the bitstream 1 for each decoder of each of a plurality of predetermined vocoders (e.g., an LPC vocoder, an MELP vocoder, a CELP vocoder).

For example, in case the plurality of vocoders include a first vocoder and a second vocoder, a first decoder for decoding a signal encoded by the first vocoder and a second decoder for decoding a signal encoded by the second vocoder may be exist. In this case, the plurality of waveforms described above may include a first waveform generated by decoding the bitstream 1 in the first decoder, and a second waveform generated by decoding the bitstream 1 in the second decoder.

The first waveform and the second waveform may be input to the second machine learning model 20, and the second machine learning model 20 may output the intelligibility value for each of the first waveform and the second waveform. If necessary, the input of the first waveform and the second waveform to the second machine learning model 20 may be performed sequentially or irrespective of the order, and the spirit of the present disclosure is not limited thereto.

In some cases, the second machine learning model 20 may be input with MFCCs (mel-frequency cepstral coefficients) calculated from each of the first waveform and the second waveform, not the first waveform and the second waveform itself. In this case, the second machine learning model 20 may be a machine learning model that is trained to output the intelligibility value based on the MFCCs, and thus, the second machine learning model 20 can output the intelligibility value for each MFCCs input. In this case, the intelligibility value may be expressed in the form of STOI (short-time objective intelligibility). Herein, the STOI is designed to objectively measure an intelligibility of the voice signal, and the intelligibility of the voice is represented by a value between 0 and 1, and the closer to 1, the clearer the voice.

The predicted type 2 of the vocoder output by the first machine learning model 10 and the intelligibility value 4 output by the second machine learning model 20 can be input to a third machine learning model 30. The third machine learning model 30 may be trained based on a relationship between the predicted type, the intelligibility value, and a type of the vocoder, and thus, the third machine learning model 30 can receive the predicted type 2 and the intelligibility value 4 of the vocoder to finally output a type 5 of the vocoder used for encoding the voice signal.

The type 5 of the vocoder output by the third machine learning model 30 may be one of the plurality of predetermined vocoders (e.g., an LPC vocoder, an MELP vocoder, a CELP vocoder) as described above. However, if necessary, the third machine learning model 30 may also output an error value (or unknown) in addition to the plurality of predetermined vocoders.

Figure 2:
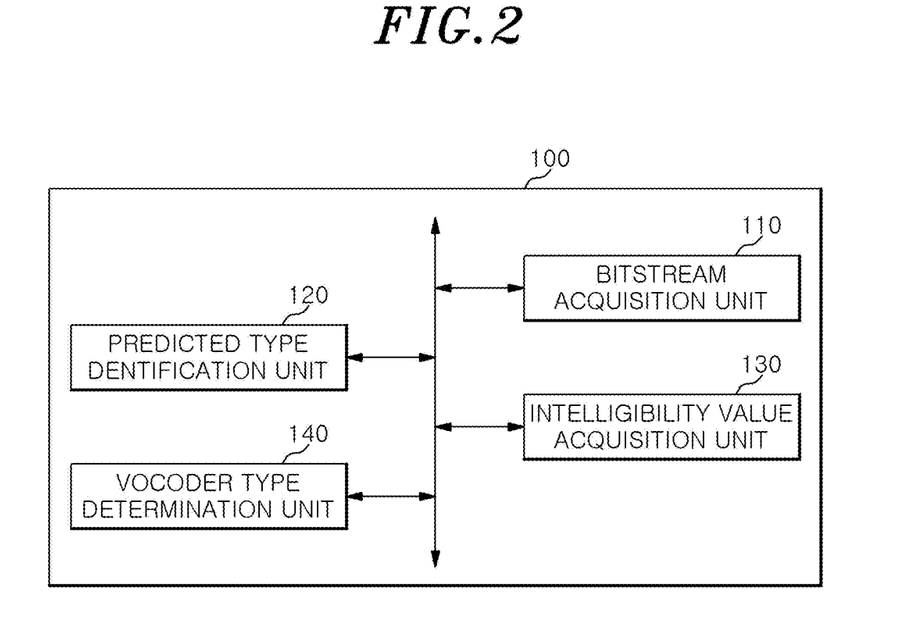
FIG. 2 shows an example of a functional block diagram of an apparatus for identifying a type of the vocoder according to an embodiment of the present disclosure.

FIG. 2 shows an example of a functional block diagram of an apparatus for identifying a type of the vocoder according to an embodiment of the present disclosure. The term "unit" as shown below means a unit that processes at least one function or operation, which may be implemented by a hardware or a software, or a combination of the hardware and the software. Hereinafter, the description of FIG. 2 overlapping with that of FIG. 1 may be omitted.

Referring to FIG. 2, the apparatus 100 for identifying a type of the vocoder may comprise a bitstream acquisition unit 110, a predicted type identification unit 120, an intelligibility value acquisition unit 130, and a vocoder type determination unit 140. The bitstream acquisition unit 110 may be implemented by a computing device including a microprocessor, which also is the same for the predicted type identification unit 120, the intelligibility value acquisition unit 130, and the vocoder type determination unit 140 as described later.

The bitstream acquisition unit 110 may acquire a bitstream 1 in which a predetermined voice signal is encoded. The predetermined voice signal is a target signal to be decoded and acquired, and the bitstream acquisition unit 110 may acquire the bitstream 1 in which the predetermined voice signal has been encoded through the vocoder. In this case, the bitstream 1 may be generated for each frame by dividing the voice signal to each frame under a predetermined time basis.

Meanwhile, information on the vocoder related to the generation of the bitstream 1 may not be given in advance, and thus the type 3 of the vocoder related to the generation of the bitstream 1 may be finally identified through the operations as described later.

The predicted type identification unit 120 may identify a predicted type of the vocoder associated with the bitstream 1. Specifically, the predicted type identification unit 120 may identify a predicted type of the vocoder associated with the bitstream 1 from the bitstream 1 obtained by the bitstream acquisition unit 110, using the first machine learning model 10. For example, the predicted type identification unit 120 may identify the predicted type based on the input of the bitstream 1 to the first machine learning model 10 so that the predicted type of the vocoder is output.

The first machine learning model 10 may be a machine learning model in which learning is performed in advance based on a relationship between a plurality of vocoders and a bitstream. The first machine learning model 10 may be, for example, trained to output a predicted type of the vocoder, which is a value that predicts a type of the related vocoder when the bitstream is input based on a deep learning algorithm.

However, the bitstream 1 input to the first machine learning model 10 depending on a training type of the first machine learning model 10, that is, a type for training data that has been used as an input value to identify the predicted type at the time of training the first machine learning model 10, may be input with a combination of the bitstreams or a feature vector associated with the bitstream.

Figure 4:
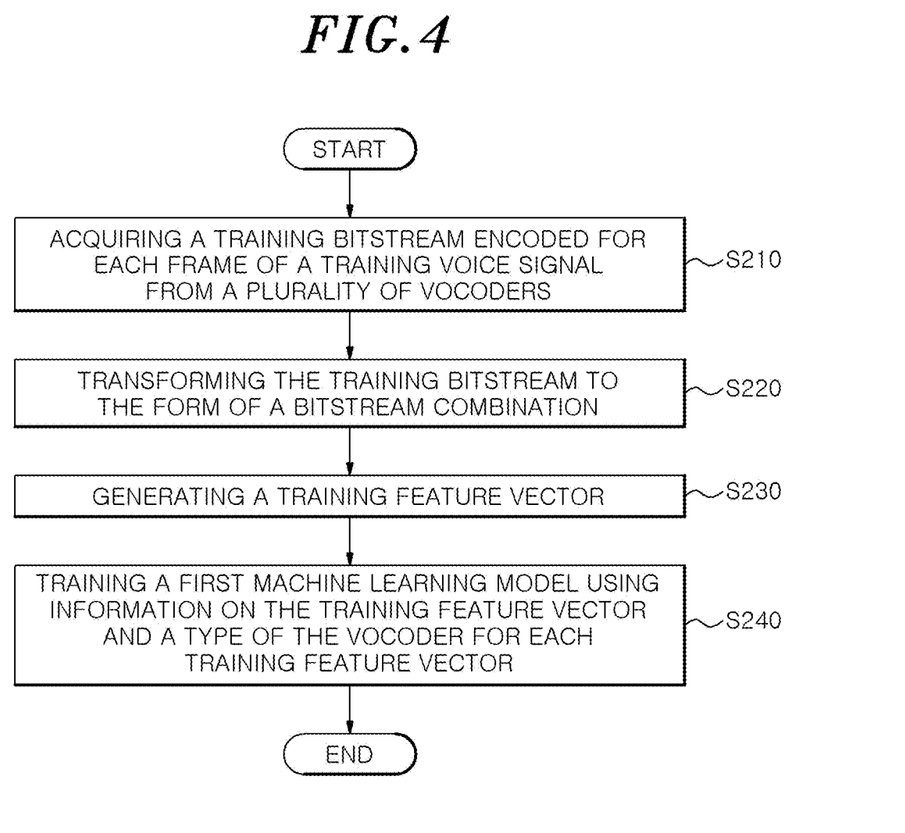
FIG. 4 shows an example of the flow of each step of a training method of a first machine learning model used for identifying a type of the vocoder according to an embodiment of the present disclosure.

Meanwhile, a detailed description on training of the first machine learning model 10 may be referred to FIG. 4.

The intelligibility value acquisition unit 130 may acquire waveforms for each decoder by inputting the bitstream 1 to the decoders of each of a plurality of vocoders, and obtain an intelligibility value for each of the acquired waveforms. Specifically, the intelligibility value acquisition unit 130 may acquire the intelligibility value for each waveform from the waveforms of each decoder, using the second machine learning model 20.

The second machine learning model 20 may be a machine learning model in which learning is performed in advance based on a relationship between the waveform and the intelligibility. The second machine learning model 20 may be, for example, trained to output the intelligibility value when the waveform, which is an output of the decoder, is input based on a deep learning algorithm. The intelligibility value is a numerical expression of the intelligibility degree of the voice signal, which is easy for those skilled in the art, and thus will not be described in detail.

If necessary, the input value of the second machine learning model 20 may be the MFCCs obtained from the waveform, not the waveform itself. In this case, the intelligibility value acquisition unit 130 may input the bitstream 1 to the decoder of each of the plurality of vocoders to obtain the waveforms for each decoder, and then calculate the MFCCs for each of the acquired waveforms. The MFCCs are feature values mainly used for voice recognition, and may be values obtained by extracting voice features in a corresponding frame through a spectrum analysis for a predetermined time frame. The MFCCs are easy for those skilled in the art, and thus detailed descriptions thereof will be omitted.

The vocoder type determination unit 140 may determine a type of the vocoder used to generate the bitstream 1 from the predicted type of the vocoder and the intelligibility value. Specifically, the vocoder type determination unit 140 may determine a type of the vocoder used to generate the bitstream 1 from the predicted type of the vocoder and the intelligibility value, using a third machine learning model 30.

For example, the vocoder type determination unit 140 may input the predicted type of the vocoder obtained from the predicted type identification unit 120 and the intelligibility value obtained from the intelligibility value acquisition unit 130 to the third machine learning model 30 to allow a type of the vocoder to be output, and may finally determine the type of vocoder used to generate the bitstream 1.

The type of the vocoder determined by the vocoder type determination unit 140 may be one of a plurality of predetermined vocoders and an error value. The type of the vocoder determined by the vocoder type determination unit 140 may be identical to or different from the predicted type of the vocoder.

Figure 3:
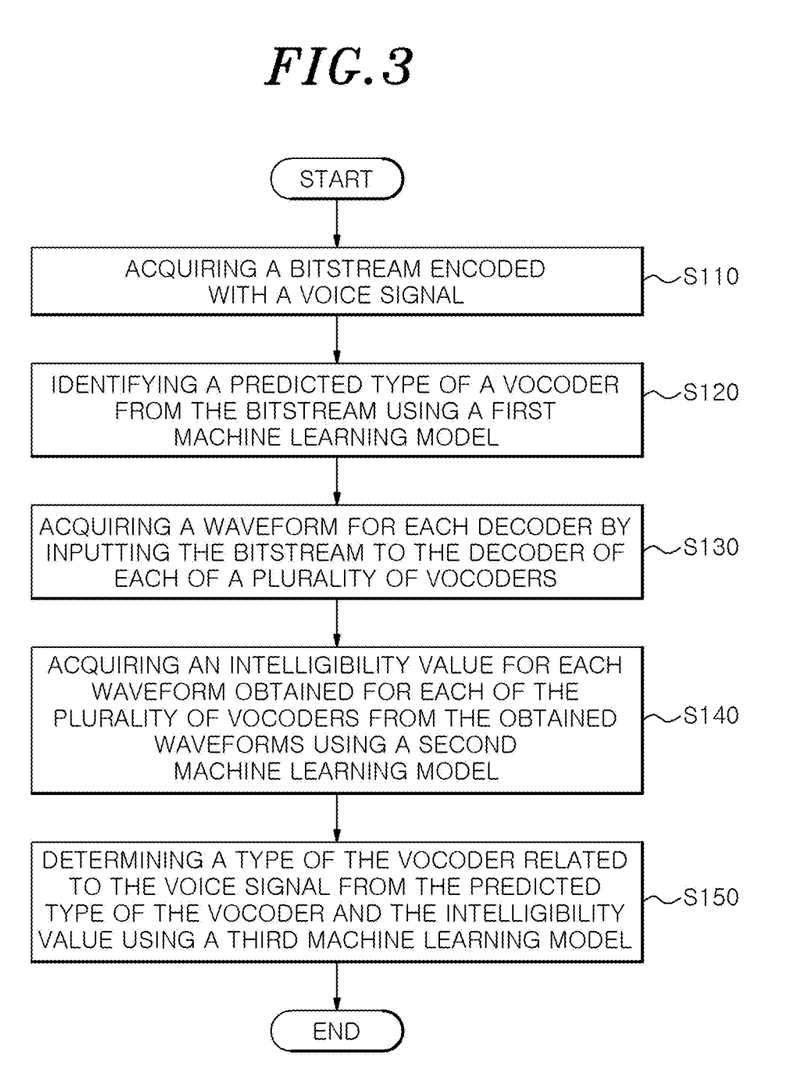
FIG. 3 shows the flow of each step of a method for identifying a type of the vocoder according to an embodiment of the present disclosure.

FIG. 3 shows the flow of each step of a method for identifying a type of the vocoder according to an embodiment of the present disclosure. In addition, each of the steps in the method shown in FIG. 3 may also be performed in orders different from the orders shown in the drawings case by case.

Referring to FIG. 3, the bitstream acquisition unit 110 may acquire a bitstream 1 in which a predetermined voice signal is encoded (S110). Specifically, the bitstream acquisition unit 110 may acquire a bitstream 1 in which a voice signal is encoded from other device that has encoded the voice signal.

The predicted type identification unit 120 may identify a predicted type of the vocoder from the bitstream 1 using the first machine learning model 10 (S120). The predicted type identification unit 120 may identify a predicted type of the vocoder by inputting the obtained bitstream 1 to the first machine learning model 10.

In some cases, the predicted type identification unit 120 may identify a predicted type of the vocoder by transforming the bitstream 1 to a bitstream combination in case the bitstream 1 is associated with m (natural numbers of 2 or more) vocoders and inputting the bitstream combination to the first machine learning model 10. A detailed description related to the bitstream combination may be referred to FIG. 5.

In this case, the first machine learning model 10, which is for a machine learning algorithm (e.g., a convolution neural network (CNN), a deep neural network (DNN)), may be a machine learning model in which learning is performed in advance so as to output a predicted type of the vocoder associated with the input of the bitstream based on a relationship between the bitstream and the predicted type of the vocoder. Meanwhile, the machine learning algorithm may be applied in various shapes and is not limited to the examples described above.

A detailed description related to training of the first machine learning model 10 may be referred to FIG. 4.

The intelligibility value acquisition unit 130 may acquire a waveform for each decoder by inputting the bitstream 1 to the decoders of each of the plurality of vocoders (S130). The intelligibility value acquisition unit 130 may acquire an intelligibility value for each waveform obtained for each of the plurality of vocoders from the waveforms obtained using the second machine learning model 20 (S140).

Specifically, the intelligibility value acquisition unit 130 inputs the bitstream 1 to each decoder corresponding to each of the plurality of vocoders to acquire waveforms for each decoder of the bitstream 1, and may calculate the intelligibility values for each waveform by inputting the acquired waveforms to the second machine learning model 20.

If necessary, the intelligibility value acquisition unit 130 acquires waveforms for each decoder of the bitstream 1 followed by transforming the acquired waveforms into MFCCs, and then may calculate the intelligibility values for each waveform by inputting them to the second machine learning model 20. In this case, the second machine learning model 20 may be a machine learning model in which learning is performed in advance such that the MFCCs for each waveform are an input value and the intelligibility value according to this is an output value. A detailed description related to training of the second machine learning model 20 may be referred to FIG. 6.

The second machine learning model 20, which is for a machine learning algorithm, may be used as the machine learning algorithm of various shapes, for example, a CNN or a DNN, and the shapes thereof are not limited to the examples described above in this specification.

In some cases, the operation performed by the predicted type identification unit 120 and the operation performed by the intelligibility value acquisition unit 130 may be carried out in parallel or in any order, and the spirit of the present disclosure is not limited to the order.

The vocoder type determination unit 140 may determine a type of the vocoder associated with a voice signal from the predicted type of the vocoder and the intelligibility value using a third machine learning model 30 (S150). Specifically, the vocoder type determination unit 140 may input the predicted type of the vocoder and the intelligibility value to the third machine learning model 30 so that the type of vocoder is output.

The third machine learning model 30 may be a machine learning model in which learning is performed to output a type of the vocoder when the predicted type of the vocoder and the intelligibility value are input based on a relationship between each of the predicted type of the vocoder and the intelligibility value, and the type of the vocoder. The third machine learning model 30, which is based on a machine learning algorithm, may be used as the machine learning algorithm of various shapes, and the shapes thereof are not limited to the examples described above in the specification.

FIG. 4 shows an example of the flow of each step of a training method of a first machine learning model used for identifying a type of the vocoder according to an embodiment of the present disclosure.

Referring to FIG. 4, training bitstreams encoded for each frame of training voice signals may be acquired from a plurality of vocoders (S210). The plurality of vocoders are two or more predetermined vocoders, and may be the vocoders available for transforming the voice signal. For example, the plurality of vocoders may include an LPC vocoder, an MELP vocoder, and a CELP vocoder.

The training bitstream may be generated by encoding with a vocoder for each frame in which the training voice signal is divided into a predetermined time frame. For example, the training voice signal may be a signal that lasts for 2 seconds, and form the frames by dividing the training voice signal at 1 second intervals. The training bitstream may be generated for each frame divided at 1 second intervals.

If a plurality of vocoders include two vocoders, that is, a first vocoder and a second vocoder, the training bitstream may be encoded using the first vocoder and the second vocoder for each of the first frame and the second frame divided at 1 second intervals. Accordingly, a 1-1 training bitstream associated with the first vocoder and a 2-1 training bitstream associated with the second vocoder may be generated for the first frame. In addition, a 2-1 training bitstream associated with the first vocoder and a 2-2 training bitstream associated with the second vocoder may also be generated for the second frame.

In some cases, each of the plurality of vocoders may have different time basis in relation to generation of the bitstream. That is, the first vocoder may generate the bitstream at 1 second intervals, but the second vocoder may generate the bitstream at 0.5 second intervals. In this case, the bitstreams for each vocoder may be generated by forming the frames for each vocoder of the voice signal depending on the time basis and then encoding them. The generated bitstreams for each vocoder is used to train the first machine learning model 10 and may be referred to as the training bitstream.

The training bitstream may be transformed in the form of a bitstream combination (S220). The training bitstream may be transformed in the form of a bitstream combination suitable for training the machine learning model. The bitstream combination is the one that the bitstreams encoded by vocoders different from each other are transformed in the form of a single bitstream, and a specific example of the bitstream combination may be referred to FIG. 5.

The bitstream combination may be generated as a combination of bitstreams for at least one vocoder among a plurality of vocoders. If two vocoders are used to generate the bitstream, a combination of the bitstreams for the used two vocoders can be generated, and if three vocoders are used to generate the bitstream, a combination of the bitstreams for the three vocoders can be generated.

A training feature vector may be generated using the bitstream combination (S230). The bitstream combination may be transformed to a feature vector representing characteristics of the bitstream combination. Herein, since the feature vector is used for training, it may be referred to as the training feature vector.

The first machine learning model 10 may be trained using information on the training feature vector and a type of the vocoder for each training feature vector (S240). The training feature vector is input to the first machine learning model 10, and the training may be performed by setting, as the correct answer value, a type of the vocoder used in connection with the training bitstream (or a bitstream combination) for the training feature vector.

Accordingly, the first machine learning model 10 may be trained to output a type of the vocoder when the feature vector is input.

Figure 5:
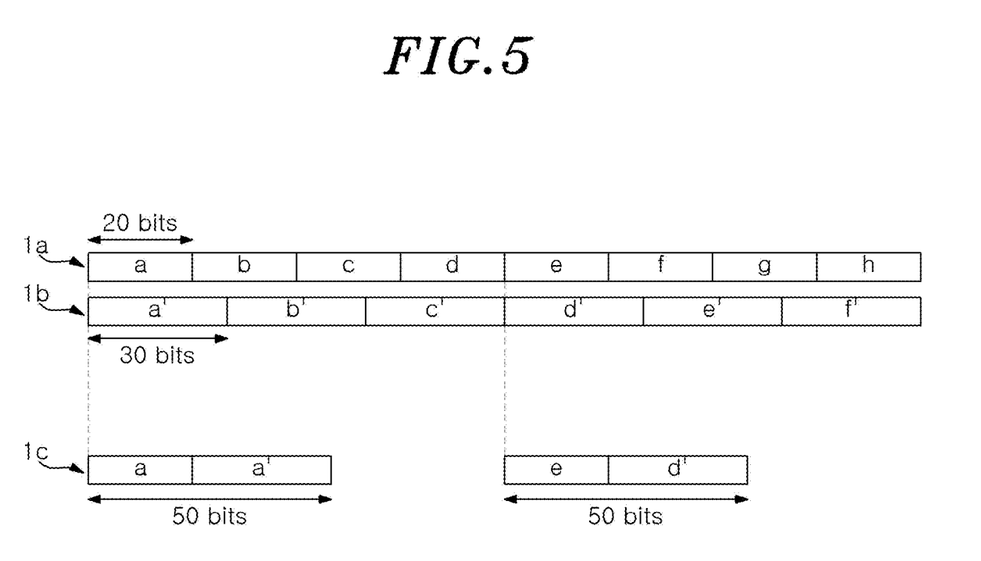
FIG. 5 shows an example of a bitstream combination input to a first machine learning model used for identifying a type of the vocoder according to an embodiment of the present disclosure.

FIG. 5 shows an example of a bitstream combination input to a first machine learning model used for identifying a type of the vocoder according to an embodiment of the present disclosure.

The reference numeral 1a may be a bitstream represented at intervals of 1.5 seconds encoded through a first vocoder, and the reference numeral 1b may be a bitstream represented at intervals of 2 seconds encoded through a second vocoder.

The bitstream encoded through the first vocoder may output 20 bits per 1.5 seconds, and the bitstream encoded through the second vocoder may output 30 bits per 2 seconds. In this case, in order to match the time intervals of each bitstream, the bitstream every 6 seconds may be acquired to form a bitstream combination.

This bitstream combination may be represented as the reference numeral 1c.

If a voice signal is a signal that lasts for 20 seconds, three bitstream combinations may be finally acquired, and training of the first machine learning model 10 may be performed using these bitstream combinations.

Figure 6:
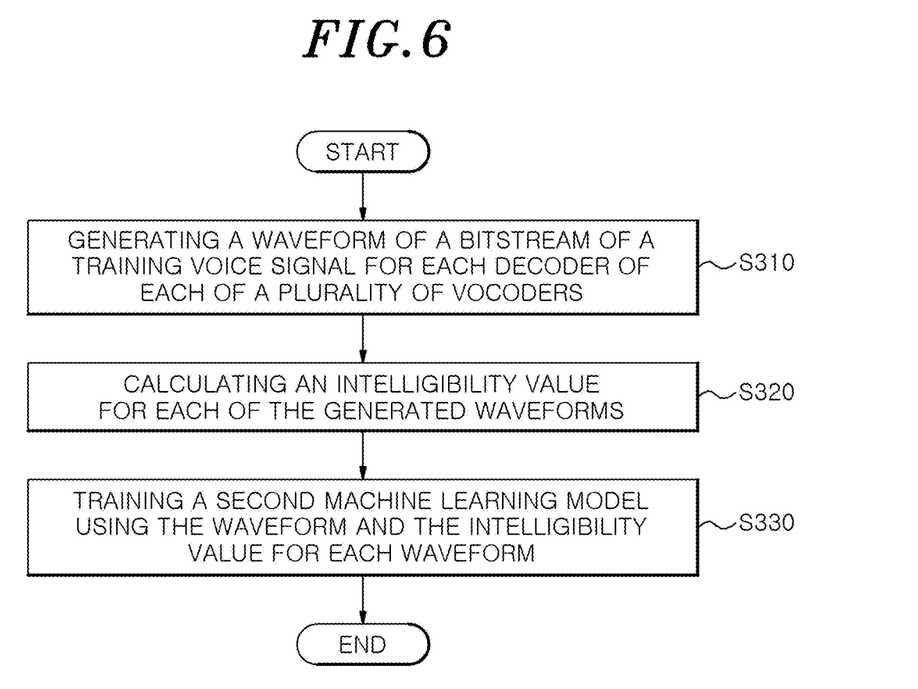
FIG. 6 shows an example of the flow of each step of a training method of a second machine learning model used for identifying a type of the vocoder according to an embodiment of the present disclosure.

FIG. 6 shows the flow of each step of a training method of a second machine learning model used for identifying a type of the vocoder according to an embodiment of the present disclosure.

Referring to FIG. 6, a waveform of a bitstream of a training voice signal for each decoder of each of a plurality of vocoders may be generated (S310). Specifically, after generating a bitstream of each of the plurality of vocoders for the training voice signal provided in advance, the waveform may be generated using a decoder for each bitstream. In some cases, the MFCCs for each waveform may be acquired by applying the MFCC analysis to each of the generated waveforms.

An intelligibility value may be calculated for each generated waveform (S320). The intelligibility value may be calculated based on the STOI.

The second machine learning model 20 may be trained using the waveform (or the MFCCs) and the intelligibility value for each waveform (S330). Specifically, the waveform (or the MFCCs) may be input to the second machine learning model 20, and learning may be performed using the intelligibility value calculated through step S320 as the correct answer value for the input waveform.

According to this, when the waveform (or the MFCCs) is input, the second machine learning model 20 may be trained to output the intelligibility value to correspond to the input waveform.

Figure 7:
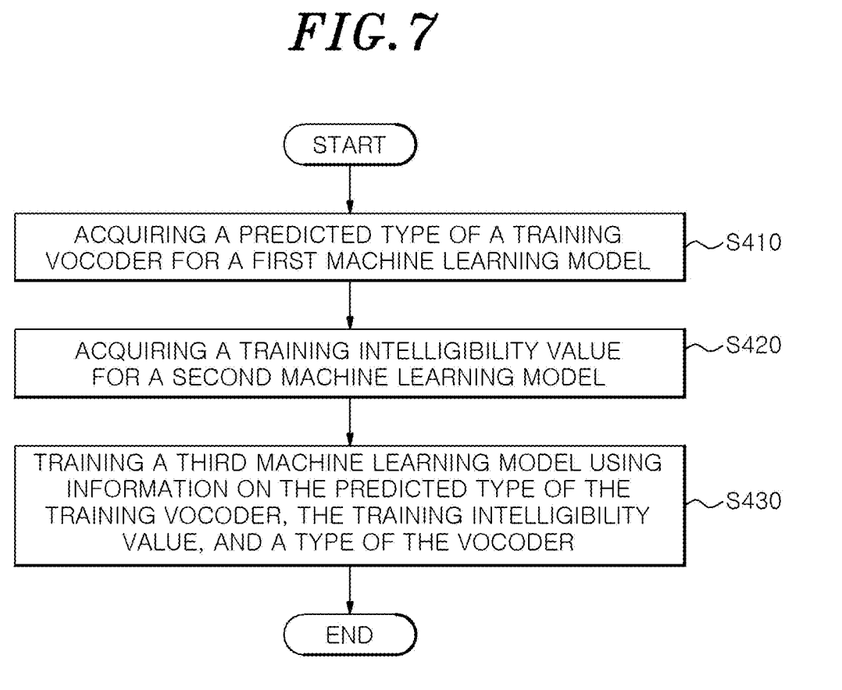
FIG. 7 shows an example of the flow of each step of a training method of a third machine learning model used for identifying a type of the vocoder according to an embodiment of the present disclosure.

FIG. 7 shows the flow of each step of a training method of a third machine learning model used for identifying a type of the vocoder according to an embodiment of the present disclosure.

Referring to FIG. 7, a predicted type of a training vocoder output by the first machine learning model 10 may be acquired (S410), and a training intelligibility value output by the second machine learning model 20 may be acquired (S420).

Acquisition of the predicted type of the training vocoder and the training intelligibility value may be performed in parallel or in any order. In addition, if necessary, the predicted type of the training vocoder may not be a value output by the first machine learning model 10, and the training intelligibility value may also not be a value output by the second machine learning model 20. In this case, the predicted type and the intelligibility value may be values that are formed in advance and stored in a database.

The third machine learning model 30 may be trained using information on the predicted type of the training vocoder, the training intelligibility, and a type of the vocoder (S430). Specifically, the predicted type of the training vocoder and the training intelligibility value may be input to the third machine learning model 30, and learning may be performed using a type of the vocoder as the correct answer value.

According to this, the third machine learning model 30 may be trained to output a type of the vocoder when the predicted type of the vocoder and the intelligibility value is input.

The method and apparatus for identifying a type of the vocoder according to an embodiment of the present disclosure can generate a bitstream using a bitstream of a voice signal, that is, identify a type of the vocoder used for encoding, even if there is no prior information on the vocoder used for encoding the voice signal. According to this, decoding can be proceeded more quickly and accurately by performing the decoding using a decoder corresponding to an identified type of the vocoder.

The method and apparatus for identifying a type of the vocoder according to an embodiment of the present disclosure acquires a predicted type of the vocoder and the intelligibility value, respectively, and also identify a type of the vocoder used for encoding the voice signal by the machine learning model more accurately.

Combinations of blocks in the flowcharts of the present disclosure can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions specified in the steps of the flowchart.

These computer program instructions may also be stored in a computer usable or computer readable memory that can direct a computer or other programmable data processing apparatuses to function in a particular manner, such that the instructions stored in the computer usable or computer readable medium can produce an article of manufacture including instructions which implement the function specified in the blocks of the flowcharts.

The computer program instructions may also be loaded onto a computer or other programmable data processing apparatuses to cause a series of operational steps to be performed on the computer or other programmable apparatuses to produce a computer implemented process such that the instructions which execute on the computer or other programmable apparatuses provide processes for implementing the functions specified in the blocks of the flowcharts.

Each block in the flowchart may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

While the present disclosure has been shown and described with respect to the embodiments, it will be understood by those skilled in the art that various changes and modifications may be made without departing from the scope of the present disclosure as defined in the following claims.

What is claimed is:

1. A method for identifying a type of a vocoder, the method comprising:
    acquiring identification target bitstreams encoded with a voice signal;
    acquiring, for each of a plurality of vocoders, a probability that each of the plurality of vocoders is related to the identification target bitstreams from the identification target bitstreams, using a first machine learning model trained based on a relationship between the plurality of vocoders and training bitstreams obtained by encoding a training voice signal by each of the plurality of vocoders;
    acquiring waveforms for each decoder of each of the plurality of vocoders by inputting the identification target bitstreams to the each decoder of each of the plurality of vocoders;
    acquiring intelligibility values for each of the waveforms obtained for the each decoder of each of the plurality of vocoders from the waveforms obtained for the each decoder of each of the plurality of vocoders, using a second machine learning model trained based on a relationship between a plurality of training waveforms obtained by inputting the training bitstreams to the each decoder of each of the plurality of vocoders and decoding the training bitstreams for each decoder of each of the plurality of vocoders, and training intelligibility values quantifying a degree of the intelligibility of the training voice signal obtained for each of the plurality of training waveforms; and
    determining the type of the vocoder related to the voice signal from the probability that each of the plurality of vocoders is related to the identification target bitstreams and the intelligibility values for each waveform obtained for each decoder of each of the plurality of vocoders, using a third machine learning model trained based on a probability for each vocoder encoding the training voice signal and a training intelligibility value of the training voice signal obtained by each decoder of the plurality of vocoders.

2. The method of claim 1, wherein the acquiring the bitstream comprises:
    dividing the voice signal into each frame determined based on a predetermined time period, and
    acquiring the identification target bitstream for each of the divided frames.

3. The method of claim 1, wherein the acquiring the probability that each of the plurality of vocoders are related to the identification target bitstreams comprises:
    extracting a feature vector from the identification target bitstreams; and
    acquiring, for each of the plurality of vocoders, the probability that each of the plurality of vocoders is related to the identification target bitstreams from the identification target bitstreams, based on input of the extracted feature vector to the first machine learning model.

4. The method of claim 1, further comprising:
    identifying a vocoder with the highest probability among the plurality of vocoders as a predicted type of the vocoder related to the voice signal, based on the probability that each of the plurality of vocoders is related to the identification target bitstreams from the identification target bitstreams.

5. The method of claim 1, wherein the acquiring the intelligibility values comprises
- calculating mel-frequency cepstral coefficients (MFCCs) for each waveform obtained for each decoder of each of the plurality of vocoders; and
- acquiring the intelligibility values for the waveforms of each of the input MFCCs based on input of the calculated MFCCs to the second machine learning model.

6. An apparatus for identifying a type of a vocoder, the apparatus comprising:
- a bitstream acquisition unit configured to acquire identification target bitstreams encoded with a voice signal;
- a predicted type identification unit configured to acquire, for each of a plurality of vocoders, a probability that each of the plurality of vocoders is related to the identification target bitstreams from the identification target bitstreams, using a first machine learning model trained based on a relationship between the plurality of vocoders and training bitstreams obtained by encoding a training voice signal by each of the plurality of vocoders;
- an intelligibility value acquisition unit configured to acquire waveforms for each decoder of each of the plurality of vocoders by inputting the identification target bitstreams to the each decoder of each of the plurality of vocoders, and acquire intelligibility values for each of the waveforms obtained for the each decoder of each of the plurality of vocoders from the waveforms obtained for the each decoder of each of the plurality of vocoders, using a second machine learning model trained based on a relationship between a plurality of training waveforms obtained by inputting the training bitstreams to the each decoder of each of the plurality of vocoders and decoding the training bitstreams for each decoder of each of the plurality of vocoders, and training intelligibility values quantifying a degree of the intelligibility of the training voice signal obtained for each of the plurality of training waveforms; and
- a vocoder type determination unit configured to determine the type of the vocoder related to the voice signal from the probability that each of the plurality of vocoders is related to the identification target bitstreams and the intelligibility values for each waveform obtained for each decoder of each of the plurality of vocoders, using a third machine learning model trained based on a probability for each vocoder encoding the training voice signal and a training intelligibility value of the training voice signal obtained by each decoder of the plurality of vocoders.

7. The apparatus of claim 6, wherein the bitstream acquisition unit is further configured to divide the voice signal into each frame determined based on a predetermined time period, and acquires the identification target bitstream for each of the divided frames.

8. The apparatus of claim 6, wherein the predicted type identification unit is further configured to:
- extract a feature vector from the identification target bitstreams, and
- acquire, for each of the plurality of vocoders, the probability that each of the plurality of vocoders is related to the identification target bitstreams from the identification target bitstreams, based on input of the extracted feature vector to the first machine learning model.

9. The apparatus of claim 6, wherein the predicted type identification unit is further configured to identify a vocoder with the highest probability among the plurality of vocoders as a predicted type of the vocoder related to the voice signal, based on the probability that each of the plurality of vocoders is related to the identification target bitstreams from the identification target bitstreams.

10. The apparatus of claim 6, wherein the intelligibility value acquisition unit is further configured to:
- Calculate mel-frequency cepstral coefficients (MFCCs) for each waveform obtained for each decoder of each of the plurality of vocoders, and
- acquire the intelligibility values for the waveforms of each of the input MFCC based on input of the calculated MFCCs to the second machine learning model.

11. A non-transitory computer-readable storage medium including computer executable instructions, wherein the instructions, when executed by a processor, cause the processor to perform a method for identifying a type of a vocoder, the method comprising:
- acquiring identification target bitstreams encoded with a voice signal;
- acquiring, for each of a plurality of vocoders, a probability that each of the plurality of vocoders is related to the identification target bitstreams from the identification target bitstreams, using a first machine learning model trained based on a relationship between the plurality of vocoders and training bitstreams obtained by encoding a training voice signal by each of the plurality of vocoders;
- acquiring waveforms for each decoder of each of the plurality of vocoders by inputting the identification target bitstreams to the each decoder of each of the plurality of vocoders;
- acquiring intelligibility values for each of the waveforms obtained for the each decoder of each of the plurality of vocoders from the waveforms obtained for the each decoder of each of the plurality of vocoders, using a second machine learning model trained based on a relationship between a plurality of training waveforms obtained by inputting the training bitstreams to the each decoder of each of the plurality of vocoders and decoding the training bitstreams for each decoder of each of the plurality of vocoders, and training intelligibility values quantifying a degree of the intelligibility of the training voice signal obtained for each of the plurality of training waveforms; and
- determining the type of the vocoder related to the voice signal from the probability that each of the plurality of vocoders is related to the identification target bitstreams and the intelligibility values for each waveform obtained for each decoder of each of the plurality of vocoders, using a third machine learning model trained based on a probability for each vocoder encoding the training voice signal and a training intelligibility value of the training voice signal obtained by each decoder of the plurality of vocoders.

* * * * *